United States Patent [19]

Akazawa et al.

[11] 4,167,248

[45] Sep. 11, 1979

[54] DEVICE FOR DISENTANGLING AND SPREADING SHORT STEEL FIBERS

[75] Inventors: Haluichi Akazawa, c/o Isaku Nishi, 5, Higashifukunokawa-cho, Okazaki, Sakyo-ku, Kyoto-shi; Kiyoshi Okada, 22-5, Yoshidakonoecho, Sakyo-ku, Kyoto-shi, both of Japan

[73] Assignees: Haluichi Akazawa; Kiyoshi Okada, both of Kyoto; Yoshiro Mizoguchi, Hirakata, all of Japan

[21] Appl. No.: 810,404

[22] Filed: Jun. 27, 1977

[30] Foreign Application Priority Data

Jul. 1, 1976 [JP] Japan .............................. 51/078712

[51] Int. Cl.² ............................................ A01C 17/00
[52] U.S. Cl. .................................. 239/683; 222/227; 222/242; 239/688
[58] Field of Search ............... 239/683, 684, 688, 689, 239/687; 222/227, 242

[56] References Cited

U.S. PATENT DOCUMENTS

| | | | |
|---|---|---|---|
| 2,535,414 | 12/1950 | Heidger | 239/683 |
| 3,094,334 | 6/1963 | Middleton et al. | 239/683 |
| 3,374,956 | 3/1968 | Bazilli et al. | 239/683 |
| 3,473,739 | 10/1969 | Singleton | 239/688 |

*Primary Examiner*—Robert W. Saifer
*Assistant Examiner*—Michael J. Forman
*Attorney, Agent, or Firm*—Weingarten, Maxham & Schurgin

[57] ABSTRACT

A device for disentangling and spreading short steel fibers used for the reinforcement or crack prevention of concrete or mortar employed for civil engineering works, building constructions or the like. The device comprises a hopper for storing short steel fibers which has a bottom opening which is connected to a nozzle. A horizontal disc rotated by a motor is mounted at the intersection of the bottom of the hopper and the nozzle with the plane of the disc parallel with the general orientation of the nozzle, the disc being formed with a plurality of plate shaped members ranged radially on its upper surface forming an impeller. Projecting from the upper surface of the disc on the axis thereof is a central boss having a plurality of vanes radially mounted thereon in such a manner that they are alternately at different heights. The boss also has pendulum-like agitating arms pivotally mounted at the top thereof.

1 Claim, 5 Drawing Figures

DEVICE FOR DISENTANGLING AND SPREADING SHORT STEEL FIBERS

BACKGROUND OF THE INVENTION

The present invention relates to a device for disentangling and spreading short steel fibers which are intended to be used for the reinforcement or crack prevention of concrete or mortar prepared for civil engineering works, building constructions or the like. The material with which the fibers is used will generally be referred to herein as concrete, that term being understood to include other similar materials.

Recently, methods of reinforcement or crack prevention of concrete have been developed which include the use of short steel fibers mixed into the concrete. Such short steel fibers are needle-shaped and are available on the market by the common name of steel fibers. It is necessary to evenly spread such fibers on the concrete during the mixing period in order to evenly mix these fibers into the material. The above-mentioned short fibers, however, by their very nature, tend to form a generally agglomerated mass where the fibers are entangled with each other. The tendency to agglomerate is enhanced during transportation and other handling of these fibers. Accordingly, no efficient device has yet appeared, even though automation of short fiber spreading is highly desired, because of the difficulty of disentangling the mass of the fibers in advance in order to spread them on the unset concrete.

SUMMARY OF THE INVENTION

It is an object of the present invention to provide a device for disentangling and spreading short steel fibers on concrete in the unset state by means of a relatively simple mechanism.

The device is comprised generally of a funnel-shaped hopper for storing the fibers, the smaller base of which is coupled to a nozzle which is arranged in a generally horizontal orientation, substantially perpendicular to the axis of the hopper. Within the apparatus at the intersection of the hopper and nozzle is a disc formed as an impeller coupled to a motor for rotation thereof. Also coupled to the motor and extending upwardly from the axis of the disc is a central boss having a plurality of vanes projecting radially therefrom positioned at at least two levels from the disc in alternating fashion, and a plurality of agitating arms which are pivotally mounted to the top of the boss.

BRIEF DESCRIPTION OF THE DRAWING

The invention will be readily understood from the following description when taken in conjunction with the accompanying drawing, in which.

DESCRIPTION OF THE PREFERRED EMBODIMENTS

Figure 1:
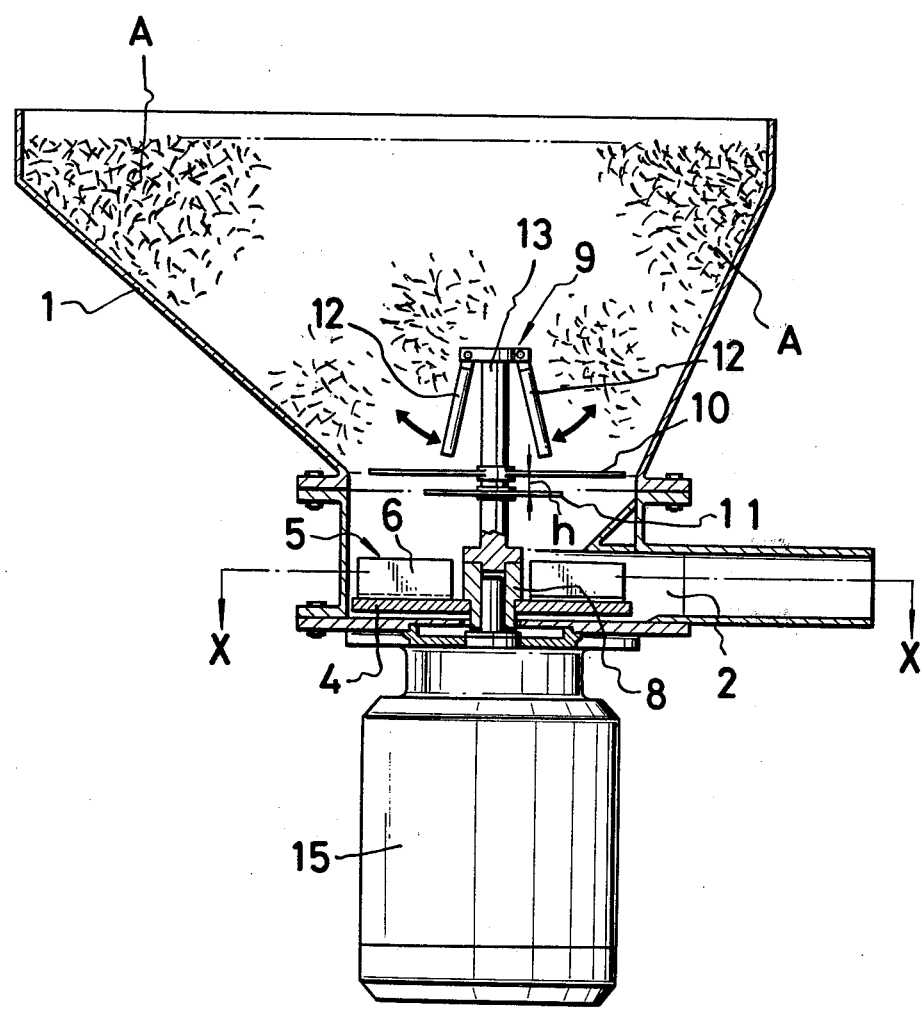
FIG. 1 is a front, partial sectional view of a device made in accordance with the present invention.
Figure 2:
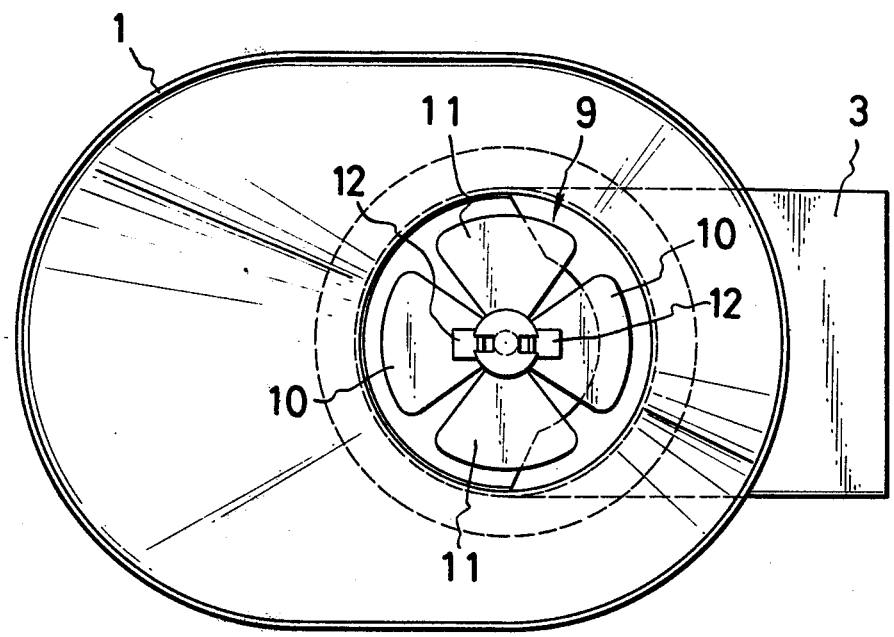
FIG. 2 is a top plan view of the invention of FIG. 1.
Figure 3:
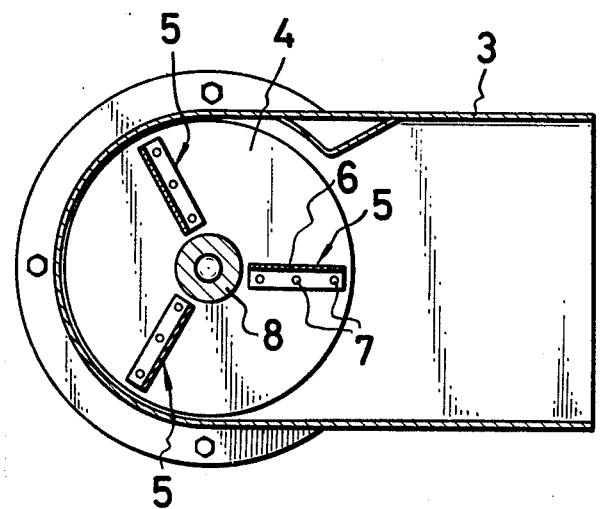
FIG. 3 is a sectional view taken along the line X—X of FIG. 1.

With reference now to FIG. 1 of the drawing, a generally truncated inverted cone-shaped hopper 1 is formed at the bottom with an aperture 2 which is oriented generally laterally with respect to the hopper axis. The larger end of the hopper opens upwardly. A rectangular elongated nozzle 3 is mounted to the outer opening of aperture 2 and is oriented in a generally horizontal direction substantially in alignment with the orientation of the aperture, normal to the hopper axis. Inside the bottom of the hopper and in alignment with the nozzle is a disc 4, the plane of the disc being generally parallel with the longitudinal orientation of the nozzle. The axis of the disc is substantially parallel with the axis of the hopper. A motor 15 is mounted below the hopper and is connected to the disc for rotation thereof at high speeds. On the upper surface of the disc are three upwardly projecting radial plate-shaped members 5. The plate-shaped members are formed as angle members 6 each having a base or horizontal portion and a vertical portion, the horizontal portion being secured to the upper surface of the disc by means such as rivets 7 (see FIGS. 3 and 4). The disc is coupled to the shaft of the motor by means of a boss 8 to which is mounted a central boss 9 projecting upwardly from the surface of the disc on the axis thereof, into the interior of the hopper. The central boss is detachably fixed to boss 8. Two sets of two-blade vanes 10 and 11 are alternately mounted on the central portion of the boss and at least a pair of pendulum-like agitating arms 12 are pivotally connected to the top of the boss within the hopper. More specifically, the foundation edge flange of the centrally raised main pillar 13 of boss 9 is fastened to the upper edge of boss 8 by means such as a bolt and the two-blade vanes 10 and 11 are alternately fixed to the central part of the pillar 13 with a predetermined gap h between respective vanes 10 and 11 in the longitudinal direction with respect to pillar 13. Each of the above-mentioned vanes is so arranged that its surface will be parallel with the upper surface of disc 4 and is so configured that the sum of the area of the vanes 10 and 11 projected onto the surface of disc 4 will be 70 to 100% of the surface area of the disc. A flange mounted on the top of pillar 13 is formed with a pair of notches in the circumference thereof in which are pivotally mounted agitating arms 12. The distal ends of the arms hang in a pendulum-like manner from the flange and tend to swing outwardly and upwardly upon rotation of the pillar.

Upon rotation of the motor, the disc 4 with plates 5 thereon, pillar 13 with vanes 10 and 11 as well as agitating arms 12 rotate simultaneously. The short fibers A stored in the hopper are effectively disentangled by this structure upon rotation of the motor and the fibers are scattered outwardly through the nozzle 3 by impeller 4, 5. The operating effect of each of the elements mentioned above will be described in detail hereinbelow.

Although the agitating arms 12 are shown as hanging downwardly under the force of gravity in FIG. 1, upon rotation of the motor and consequently pillar 13, these arms will essentially expand outwardly and upwardly as shown by the arrows in FIG. 1. Generally when the hopper is filled, there is a mass of fibers A surrounding arms 12 in such a manner as to generally prevent expansion upwardly of these arms. Under these conditions, arms 12 will contact and essentially disentangle fibers from the mass of fibers A so that they drop down toward the bottom of the hopper and this continues in a sequential manner as agitating arms 12 continue to make contact at the boundary of the mass of fibers surrounding central boss 9. By means of this structure, the device has the effect of preventing clogging of the fibers near the hopper base so that a so-called bridge is not formed at the base of the hopper which would prevent feeding of the fibers to the nozzle.

The vanes 10 and 11 essentially regulate the amount of short fibers fed to disc 4 when the motor 15 is rotating so that fibers do not fall upon the disc in the form of a mass. Without vanes 10, 11, not only would an unnecessarily great amount of force be required at the time of starting the motor 15, but it would also become impossible to adjust the spreading amount of the fibers A because of the great mass of fibers which would be supplied to disc 4 when the hopper is in its normal substantially full condition. With vanes 10, 11 mounted to boss 9, the fibers do not drop onto disc 4 at the time of stopping the motor. Because the vanes prevent the disc from being clogged when the device is turned off, the starting torque of the motor need not be great and the motor can have a relatively small capacity as compared with the requirements if the vanes 10 and 11 were not employed. It has been found by experimentation that the fibers supplied to disc 4 during rotation of motor 15 may be altered by changing the distance h, which is the height between alternating vanes 10 and 11. By this means, it is possible to adjust the amount or density of the fibers spread on the concrete by making adjustments in vanes 10 and 11.

An impeller is formed by disc 4 and plate-shaped members 5 mounted thereto. When fibers which are loosened by agitating arms 12 and controlled by vanes 10, 11 drop on the surface of the impeller, they are spread outwardly by the centrifugal force of the rotating disc. This device is effective in evenly spreading the fibers because the distance which the fibers are projected by the impeller differs slightly depending upon their size and the position on the disc at which each fiber lands. Thus, by positioning the apparatus of the invention at a proper location with respect to a concrete mixer, the reinforcing short steel fibers can be evenly mixed into the concrete.

Figure 4A:
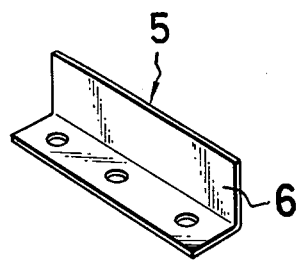
FIGS. 4(A), 4(B) and 4(C) are perspective views of alternative embodiments of the plate-shaped members attached to the disc.
Figure 4B:
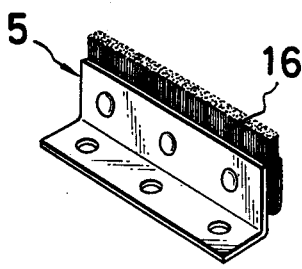
Figure 4C:
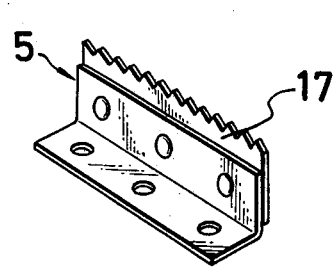
Figure 5:
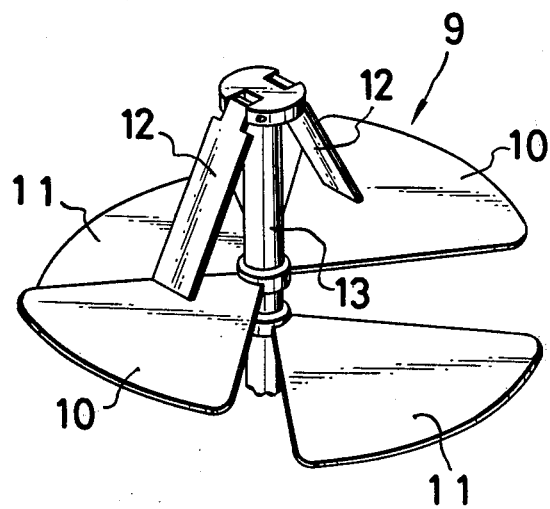
FIG. 5 is a perspective view showing the central boss.

It should be noted that the number of vanes comprising vanes 10 and 11 and the distance relationship between them are not limited to the characteristics described and shown in the drawing. Furthermore, the plate-shaped members 5 may take on other forms as shown in FIG. 4(A-C). In FIG. 4(B) the vertical edge of the plate 5 is formed as a brush and in FIG. 4(C) the vertical edge is formed in a toothed manner such as a saw blade. By so modifying the shape of these members, it is possible to more evenly spread the fibers and facilitate their disentanglement because these devices would effectively comb the fibers which are dropped from vanes 10 and 11 onto disc 4.

In summary, the present invention can provide a short fiber spreader which is able to evenly spread fibers through a nozzle onto concrete in the unset state, as well as to disentangle the mass of short fibers stored in a hopper by rotating a disc having an appropriately configured boss on the axis thereof at the base of the hopper. It is likely that modifications and improvements will occur to those skilled in this art which are within the scope of the present invention.

We claim:

1. Apparatus for disentangling and spreading short steel fibers, said apparatus comprising:

a hopper for holding the short steel fibers, said hopper having a constricted opening at the bottom thereof and being configured with an aperture below said opening oriented generally perpendicularly with respect to the vertical axis of the hopper;

a nozzle mounted to said aperture wherein the interior of said hopper communicates with the interior of said nozzle through said aperture, said nozzle being oriented in a direction generally in alignment with said aperture, substantially perpendicular to said axis of said hopper;

a disc mounted for rotation at the base of said hopper, the plane of said disc being below said opening and being substantially perpendicular to said axis of said hopper and aligned with said nozzle;

a motor connected to said disc for rotation thereof;

a plurality of upstanding plate-shaped members mounted to said disc and oriented generally in a radial direction from the axis thereof;

a central boss mounted on the axis of said disc and extending upwardly into and parallel to said axis of said hopper;

a first set of vanes mounted to and radially extending from said boss and spaced from said disc;

a second set of vanes mounted to and radially extending from said boss and spaced from said disc, said second set of vanes being spaced from said first set of vanes by a predetermined distance, the vanes of said first and second set of vanes alternating circumferentially around said boss, being located in the vicinity of said constricted opening, and having a combined vertical projection surface area between 70% and 100% of the surface area of said disc; and a plurality of rigid arms pivotally mounted to the top of said boss, said arms pivoting outwardly upon rotation of said boss, said arms hanging downwardly when said boss is not rotating;

whereby short steel fibers are disentangled by said arms, fed in a measured manner to said disc by said vanes and distributed evenly through said nozzle by said plate-shaped members on said rotating disc when said disc is rotated, said vanes preventing the steel fibers from dropping onto said disc when said disc is stopped.

* * * * *